US012764800B2

(12) United States Patent
Kishida et al.

(10) Patent No.: US 12,764,800 B2
(45) Date of Patent: Oct. 13, 2026

(54) TRANSMITTING STATION AND RECEIVING STATION FOR ATTACHING IDENTIFICATION INFORMATION AND OUTPUTTING DATA

(71) Applicant: NTT, Inc., Tokyo (JP)

(72) Inventors: Akira Kishida, Musashino (JP); Kengo Nagata, Musashino (JP); Yasuhiko Inoue, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 667 days.

(21) Appl. No.: 18/031,342

(22) PCT Filed: Oct. 13, 2020

(86) PCT No.: PCT/JP2020/038622

§ 371 (c)(1),
(2) Date: Apr. 11, 2023

(87) PCT Pub. No.: WO2022/079802

PCT Pub. Date: Apr. 21, 2022

(65) Prior Publication Data

US 2023/0413347 A1 Dec. 21, 2023

(51) Int. Cl.
*H04W 4/00* (2018.01)
*H04W 76/10* (2018.01)
*H04W 84/12* (2009.01)

(52) U.S. Cl.
CPC ............ *H04W 76/10* (2018.02); *H04W 84/12* (2013.01)

(58) Field of Classification Search
CPC ...................................................... H04W 84/12
See application file for complete search history.

(56) References Cited

U.S. PATENT DOCUMENTS 5,046,066 A * 9/1991 Messenger ............ H04W 74/06 375/267
5,339,316 A * 8/1994 Diepstraten ........... H04L 1/1607 370/401
6,496,798 B1 * 12/2002 Huang .................. G10L 19/167 704/201

(Continued)

FOREIGN PATENT DOCUMENTS

CN 108696284 A 10/2018
JP H06303257 A 10/1994

(Continued)

OTHER PUBLICATIONS

International Searching Authority, English Translation of the Written Opinion of the International Searching Authority PCT/JP2020/038622, WIPO, Apr. 13, 2023, pp. 1-4. (Year: 2023).*

(Continued)

*Primary Examiner* — Elisabeth Benoit Magloire

(57) ABSTRACT

A transmitting station includes a first wireless signal processing unit, a second wireless signal processing unit, and a link management unit. The first and second wireless signal processing units are configured to transmit wireless signals using different channels. The link management unit manages link states of the first and second wireless signal processing units. The link management unit is configured to: generate, when first data input is of a specific type, second data that is a duplicate of the first data; attach, first identification information indicating that the first data is original data, to the first data and attach, second identification information indicating that the second data is replicated data, to the second data; and output the first data with the first identification information attached to the first wireless signal processing unit and output the second data with the second identification information attached to the second wireless signal processing unit.

8 Claims, 12 Drawing Sheets

(56) References Cited

U.S. PATENT DOCUMENTS

| | | | | |
|---|---|---|---|---|
| 10,153,802 | B2 | 12/2018 | Takasaka et al. | |
| 11,979,773 | B2 | 5/2024 | Jauh et al. | |
| 2003/0112780 | A1 * | 6/2003 | Ouyang | H04L 1/1845 370/349 |
| 2010/0128724 | A1 * | 5/2010 | Oliveira | H04L 27/261 370/389 |
| 2013/0057639 | A1 * | 3/2013 | Ralston | H04N 21/2405 348/14.02 |
| 2013/0315139 | A1 * | 11/2013 | Abraham | H04L 1/1867 370/328 |
| 2016/0149801 | A1 * | 5/2016 | Morosan | H04L 69/14 370/228 |
| 2018/0054847 | A1 * | 2/2018 | Cariou | H04W 28/0861 |
| 2018/0184428 | A1 * | 6/2018 | Cariou | H04W 12/06 |
| 2018/0287656 | A1 | 10/2018 | Takasaka et al. | |
| 2019/0363843 | A1 | 11/2019 | Gordaychik | |
| 2020/0344723 | A1 * | 10/2020 | Babaei | H04W 72/23 |

FOREIGN PATENT DOCUMENTS

| | | | |
|---|---|---|---|
| JP | 2007209040 | A | 8/2007 |
| JP | 2010278845 | A | 12/2010 |
| JP | 2011151547 | A | 8/2011 |
| JP | 2015097349 | A | 5/2015 |
| JP | 2017046270 | A | 3/2017 |
| JP | 2018170619 | A | 11/2018 |
| JP | 2019068252 | A | 4/2019 |
| KR | 20170043009 | A | 4/2017 |
| WO | WO-2020156591 | A1 | 8/2020 |

OTHER PUBLICATIONS

IEEE Std 802. Nov. 2016, “10.22.2 HCF contention based channel access (EDCA) ”, Dec. 7, 2016.

International Search Report issued in PCT/JP2020/038622, mailed on Feb. 22, 2021; ISA/JP.

* cited by examiner

Fig. 9

| STA FUNCTION | FREQUENCY BAND | LINK DESTINATION ID | MULTI-LINK | TID |
|---|---|---|---|---|
| STA1 | 6GHz | XX | ○ | #1,#2 |
| STA2 | 5GHz | XX | ○ | #1,#3 |
| STA3 | 2.4GHz | – | – | – |

Fig. 10

| | STA1 | STA2 | STA3 |
|---|---|---|---|
| TID#1 | PRIMARY | SECONDARY | — |
| TID#2 | — | — | — |
| TID#3 | — | — | — |

TRANSMITTING STATION AND RECEIVING STATION FOR ATTACHING IDENTIFICATION INFORMATION AND OUTPUTTING DATA

CROSS REFERENCE TO RELATED APPLICATIONS

This application is a U.S. National Phase Application under 35 U.S.C. 371 of International Application No. PCT/JP2020/038622 filed on Oct. 13, 2020. The entire disclosure of the above application is incorporated herein by reference.

TECHNICAL FIELD

An embodiment relates to a transmitting station and a receiving station.

BACKGROUND ART

A wireless local area network (LAN) is known as a wireless system between a transmitting station that transmits wireless signals and a receiving station that receives wireless signals, such as an access point and a terminal.

CITATION LIST

Non Patent Literature

NPL 1: IEEE Std 802.11-2016, "10.22.2 HCF contention based channel access (EDCA)", 7 Dec. 2016

SUMMARY OF INVENTION

Technical Problem

An embodiment provides a transmitting station and a receiving station capable of using an application having absolute requirements for delay.

Solution to Problem

According to an embodiment, a transmitting station includes a first wireless signal processing unit, a second wireless signal processing unit, and a link management unit. The first wireless signal processing unit is configured to transmit wireless signals using a first channel. The second wireless signal processing unit is configured to transmit wireless signals using a second channel different from the first channel. The link management unit is configured to manage a link state between the first wireless signal processing unit and a receiving station, and a link state between the second wireless signal processing unit and the receiving station. The link management unit is configured to: generate, when first data input is of a specific type, second data that is a duplicate of the first data; attach, first identification information indicating that the first data is original data, to the first data and attach, second identification information indicating that the second data is replicated data, to the second data; and output the first data with the first identification information attached to the first wireless signal processing unit and output the second data with the second identification information attached to the second wireless signal processing unit.

Advantageous Effects of Invention

According to the embodiment, it is possible to provide a transmitting station and a receiving station capable of using an application having absolute requirements for delay.

BRIEF DESCRIPTION OF DRAWINGS

FIG. 9 illustrates one example of link management information.

FIG. 10 is a diagram illustrating one example of association information between TID and a primary link, further included in the link management information.

DESCRIPTION OF EMBODIMENTS

Figure 1:
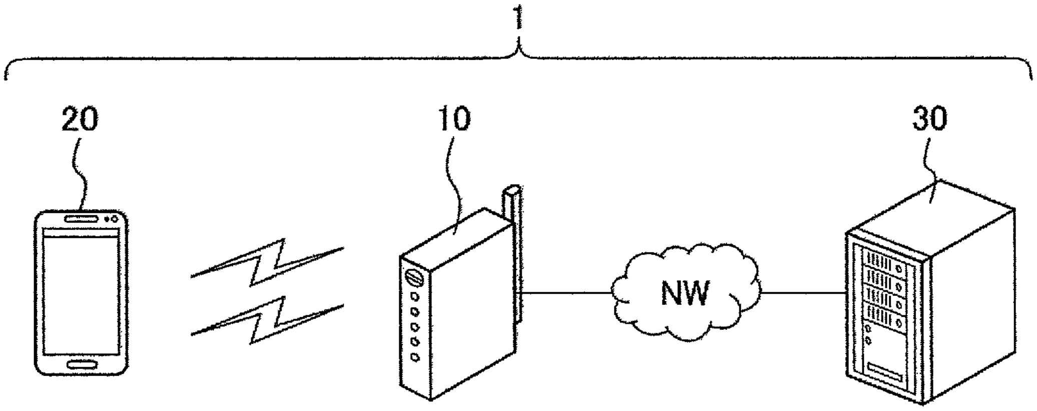
FIG. 1 is a diagram illustrating one example of a configuration of a wireless system according to an embodiment.

Embodiments will be described hereinafter with reference to the drawings. FIG. 1 shows one example of a configuration of a wireless system 1 according to an embodiment. As illustrated in FIG. 1, a wireless system 1 includes, for example, as an access point 10, a terminal 20, and a server 30.

The access point 10 is connected to a network NW and is used as an access point of a wireless LAN. For example, the access point 10 can wirelessly transmit data received from the network NW to the terminal 20. The access point 10 can also be connected to the terminal 20 using one channel or a plurality of different channels. In the present specification, wireless connection between the access point 10 and the terminal 20 using a plurality of different channels will be referred to as "multi-link". Communication between the access point 10 and the terminal 20 is based on, for example, the IEEE 802.11 protocol.

The terminal 20 is a wireless terminal such as a smartphone or a tablet PC. The terminal 20 can transmit and receive data to and from the server 30 on the network NW via the access point 10 which is connected wirelessly. The terminal 20 may be other electronic equipment, such as a desktop computer or a laptop computer. The terminal 20 has no specific limitations as long as at least it is able to communicate with the access point 10.

The server 30 can retain various types of information and retain, for example, data of contents for the terminal 20. The server 30 is connected to, for example, the network NW by wire and is able to communicate with the access point 10 via the network NW. The server 30 has no specific limitations as long as at least it is able to communicate with the access point 10. That is, communication between the access point 10 and the server 30 may be by wire or wireless.

In the wireless system 1 according to the embodiment, data communication between the access point 10 and the terminal 20 is based on the Open Systems Interconnection (OSI) reference model. In the OSI reference model, the communications are split into seven different layers (1. physical layer, 2. data link layer, 3. network layer, 4. transport layer, 5. session layer, 6. presentation layer, and 7. application layer). Further, the data link layer is divided into two sublayers, for example, a logical link control (LLC) layer and a medium access control (MAC) layer. In the LLC layer, for example, an LLC packet is formed by adding a destination service access point (DSAP) header or source service access point (SSAP) header to data input from a higher-level application. In the MAC layer, for example, a MAC frame is formed by adding a MAC header to the LLC packet.

Figure 2:
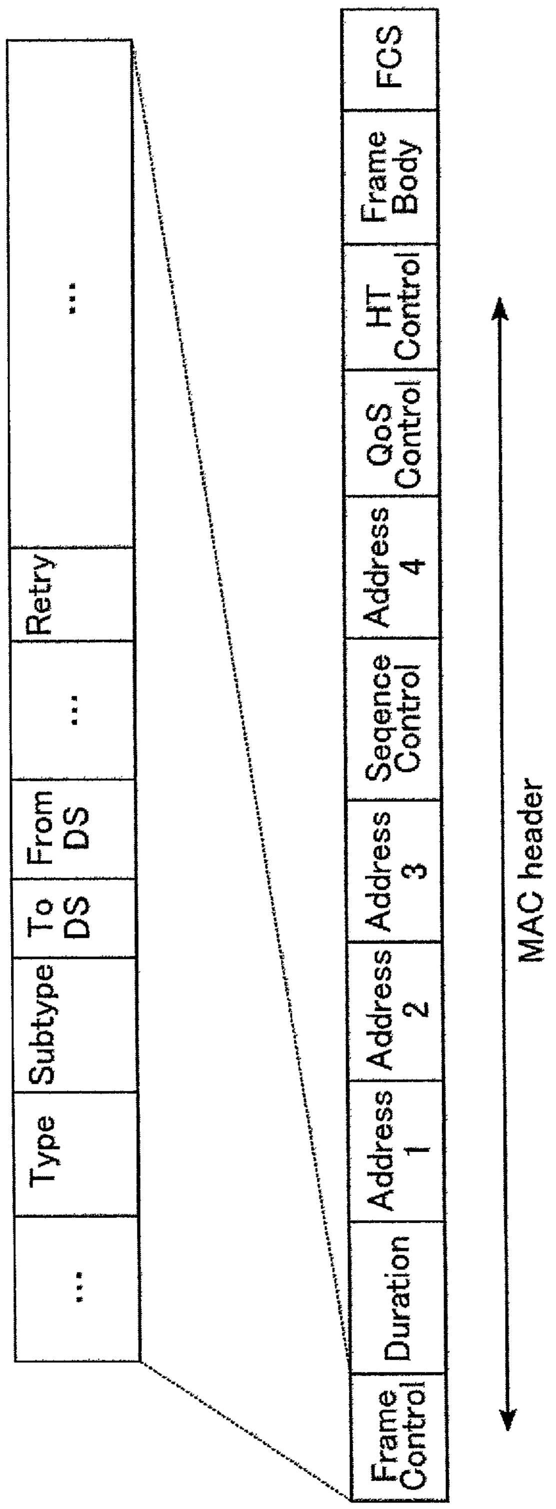
FIG. 2 is a diagram illustrating a specific example of a MAC frame format.

FIG. 2 shows a specific example of a MAC frame format used in communication between the access point 10 and terminal 20 in the wireless system 1 according to the embodiment. As shown in FIG. 2, a MAC frame is constructed of, for example, Frame Control field, Duration field, Address 1 field, Address 2 field, Address 3 field, Sequence Control field, Address 4 field, a QoS Control field, HT Control field, Frame Body field and frame check sequence (FCS) field. These fields may be included or not included depending on the type of a wireless frame.

The Frame Control field to the HT Control field correspond to the MAC header. The Frame Body field corresponds to a MAC payload. The FCS field stores an error detection code between the MAC header and the Frame Body field. The FCS field is used to determine whether there is an error in the MAC frame.

The Frame Control field indicates various types of control information and includes, for example, a Type value, a Subtype value, a To DS (distribution system) value, a From DS value, and a Retry value.

The Type value indicates whether the MAC frame is a management frame, a control frame, or a data frame. The Subtype value indicates a frame type of the MAC frame in combination with the Type value. For example, "00/1000 (Type value/Subtype value)" indicates that the MAC frame is a beacon signal. "00/0100 (Type value/Subtype value)" indicates that the MAC frame is a probe request. Further, "00/0101 (Type value/Subtype value)" indicates that the MAC frame is a probe response.

The To DS value and the From DS value have different meanings depending on a combination. For example, when the MAC frame is a data frame, if the To DS value is "0", it indicates that the receiving station is a terminal; if the To DS value is "1", it indicates that the receiving station is as an access point. For example, when the MAC frame is a data frame, if the From DS value is "0", it indicates that the transmitting station is a terminal; if the From DS value is "1", it indicates that the transmitting station is as an access point. On the other hand, when the MAC frame is a management frame or a control frame, the To DS value and the From DS value are fixed to, for example, "0".

The Retry value indicates whether or not the MAC frame is a retransmission frame. For example, if the Retry value is "0", it indicates that the MAC frame is not a retransmission frame, i.e. the original MAC frame. On the other hand, if the Retry value is "1", it indicates that the MAC frame is a retransmission frame.

The Duration field indicates a scheduled period for using a wireless channel. The Address field indicates, for example, a BSSID, a transmission source MAC address, a destination MAC address, an address of a transmitter terminal, and an address of a receiver terminal. The number of Address fields used varies depending on the frame type. The Sequence Control field indicates a sequence number of the MAC frame and a fragment number for a fragment. The QoS Control field is used for a quality-of-service (QoS) function in the MAC frame. The QoS Control field may include a Traffic Identifier (TID) subfield. The HT Control field is a Control field for a high-throughput function. The Frame Body field includes information according to a frame type. For example, in a case where the frame type is a data frame, transmission data is stored in the Frame Body field.

Figure 3:
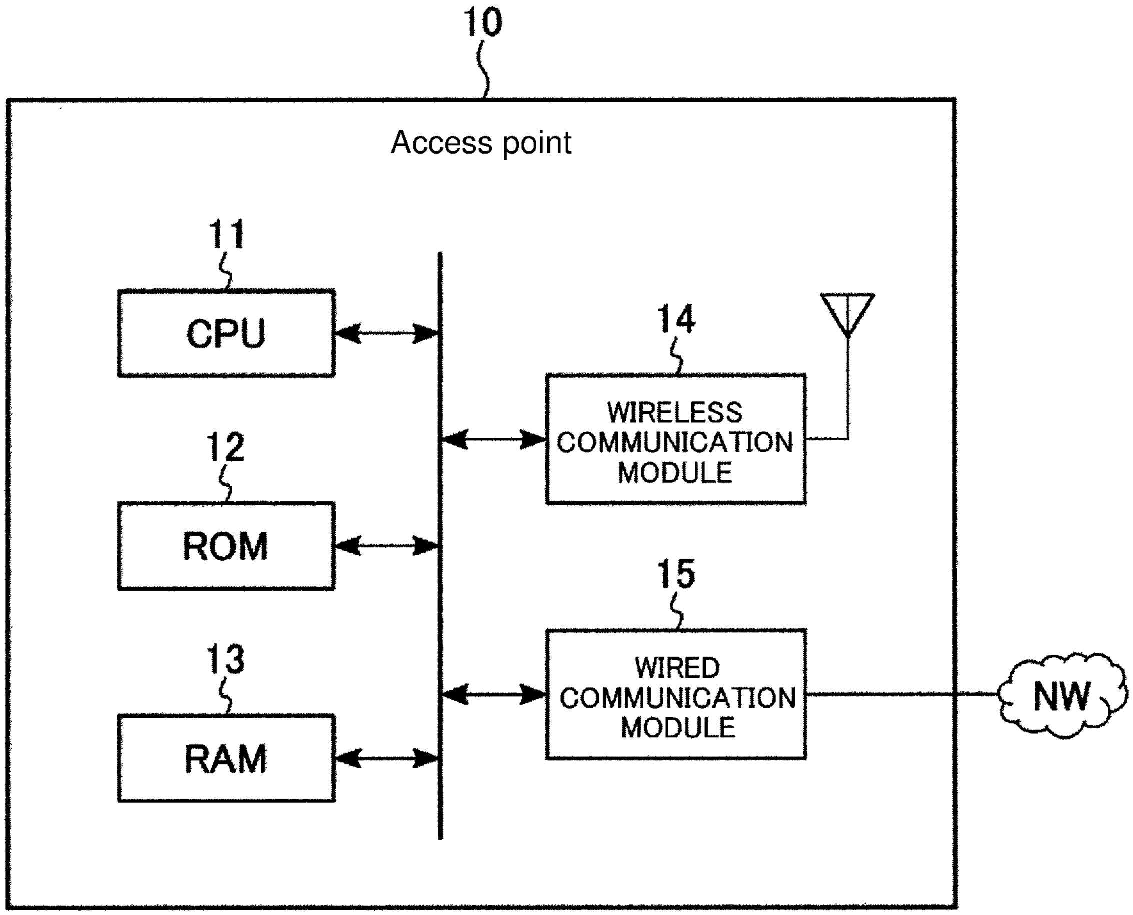
FIG. 3 is a diagram illustrating one example of a configuration as an access point.

FIG. 3 shows one example of a configuration of the access point 10. As shown in FIG. 3, the access point 10 includes, for example, a central processing unit (CPU) 11, a read only memory (ROM) 12, a random access memory (RAM) 13, a wireless communication module 14, and a wired communication module 15.

The CPU 11 is a circuit capable of executing various programs, and controls overall operations of the access point 10. The ROM 12 is a non-volatile semiconductor memory and retains, for example, a program and control data for controlling the access point 10. The RAM 13 is, for example, a volatile semiconductor memory and is used as a work area of the CPU 11. The wireless communication module 14 is a circuit used to transmit and receive data by wireless signals and is connected to an antenna. The wireless communication module 14 includes, for example, a plurality of communication modules respectively corresponding to a plurality of frequency bands. The wired communication module 15 is a circuit used to transmit and receive data using a wired signal and is connected to the network NW.

Figure 4:
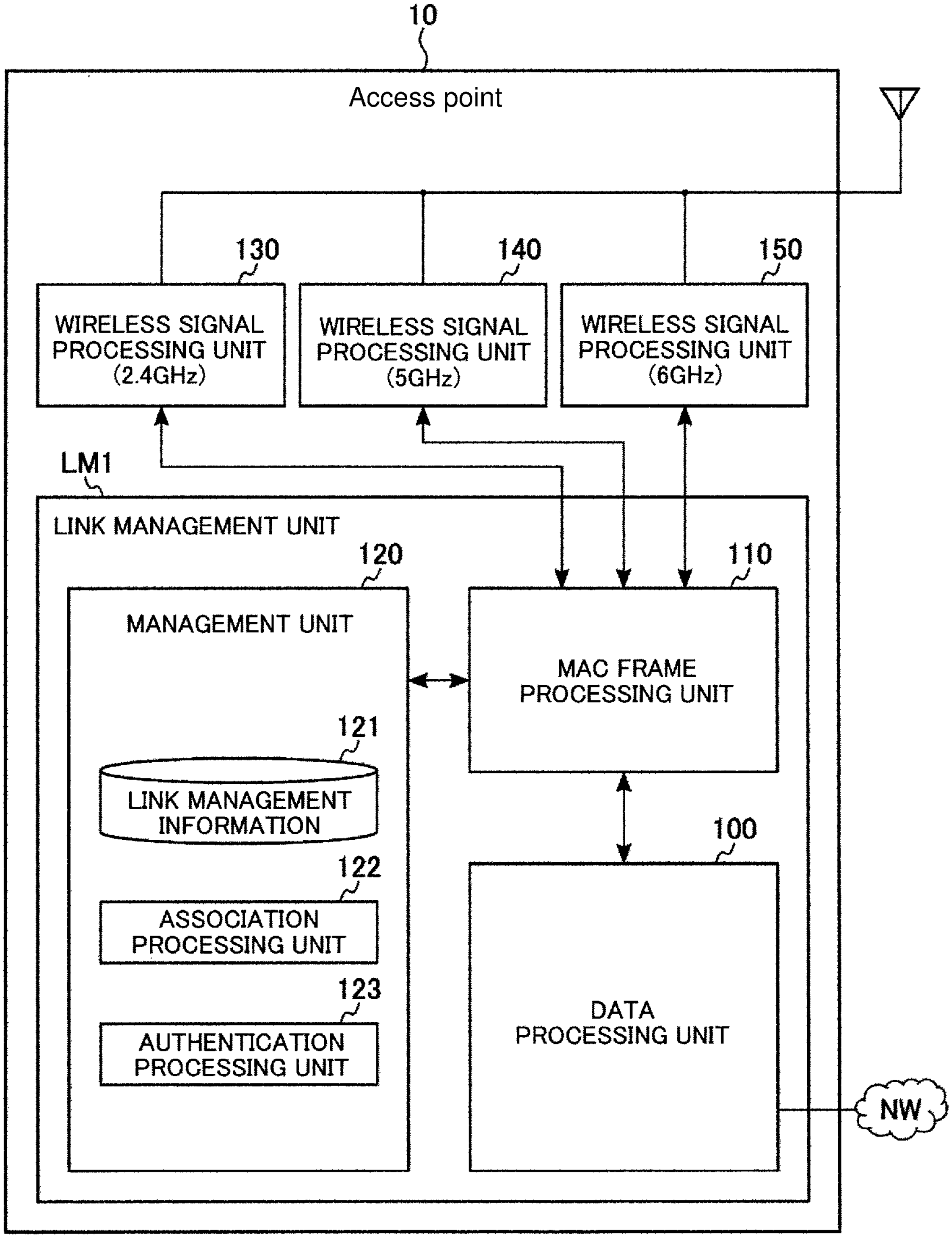
FIG. 4 is a diagram illustrating one example of a functional configuration of the access point.

FIG. 4 shows one example of a functional configuration of the access point 10. As shown in FIG. 4, the access point 10 includes, for example, a data processing unit 100, a MAC frame processing unit 110, a management unit 120, and wireless signal processing units 130, 140 and 150. Processing of the data processing unit 100, the MAC frame processing unit 110, the management unit 120, and the wireless signal processing units 130, 140 and 150 is implemented by, for example, the CPU 11 and the wireless communication module 14.

The data processing unit 100 can perform the processing of the LLC layer and the processing of the higher layers (the third to seventh layers) on the input data. For example, the data processing unit 100 outputs the data input from the server 30 via the network NW to the MAC frame processing unit 110. Further, the data processing unit 100 transmits the data input from the MAC frame processing unit 110 to the server 30 via the network NW.

The MAC frame processing unit 110 executes processing of, for example, the MAC layer on the input data. For example, the MAC frame processing unit 110 generates a MAC frame from the data input by the data processing unit 100. Moreover, the MAC frame processing unit 110 restores data from the MAC frames input by the wireless signal processing units 130, 140 and 150, respectively. The processing of generating the MAC frame from the data and the processing of restoring the data from the MAC frame are performed based on the IEEE 802.11 protocol. When a traffic type of the input data is a specific type, the MAC frame processing unit 110 duplicates the input data and generates a MAC frame based on the replicated data. The specific type is, for example, real-time application (RTA) traffic having absolute delay requirements. When the MAC frame is generated based on the replicated data, the MAC frame processing unit 110 attaches to the MAC frame identification information indicating whether or not the generated MAC frame is based on the replicated data. The MAC frame processing unit 110 selects one of the original and replicated MAC frames when the input MAC frames include the identical frames.

The management unit 120 manages a link with the terminal 20 based on notifications received from the wireless signal processing units 130, 140 and 150 via the MAC frame processing unit 110. The management unit 120 includes link management information 121. The link management information 121 is stored in, for example, the RAM 13, and includes information on the terminal 20 that is wirelessly connected to the access point 10. The management unit 120 includes an association processing unit 122 and an authentication processing unit 123. In a case where the association processing unit 122 receives a connection request of the terminal 20 via one of the wireless signal processing units 130, 140 and 150, the association processing unit 122 executes a protocol related to the association. The authentication processing unit 123 executes a protocol related to authentication following the connection request. Hereinafter, a set of the data processing unit 100, the MAC frame processing unit 110, and the management unit 120 is referred to as a link management unit LM1 of the access point 10.

Each of the wireless signal processing units 130, 140 and 150 transmits and receives data between the access point 10 and the terminal 20 using wireless communication. For example, each of the wireless signal processing units 130, 140 and 150 adds a preamble or a PHY header to the MAC frame input from the MAC frame processing unit 110 to create a wireless frame. Each of the wireless signal processing units 130, 140 and 150 then converts the wireless frame into a wireless signal and distributes the wireless signal via an antenna of the access point 10. Each of the wireless signal processing units 130, 140 and 150 converts a wireless signal received via the antenna of the access point 10 into a wireless frame. Moreover, each of the wireless signal processing units 130, 140 and 150 outputs data included in the wireless frame (for example, MAC frame) to the MAC frame processing unit 110.

Consequently, each of the wireless signal processing units 130, 140 and 150 can perform, for example, a part of the processing of the MAC layer and the processing of the first layer on the input data or the wireless signal. For example, the wireless signal processing unit 130 covers wireless signals in the 2.4 GHz band. The wireless signal processing unit 140 covers wireless signals in the 5 GHz band. The wireless signal processing unit 150 covers a wireless signal of the 6 GHz band. The wireless signal processing units 130, 140 and 150 may or may not share the antenna of the access point 10.

Figure 5:
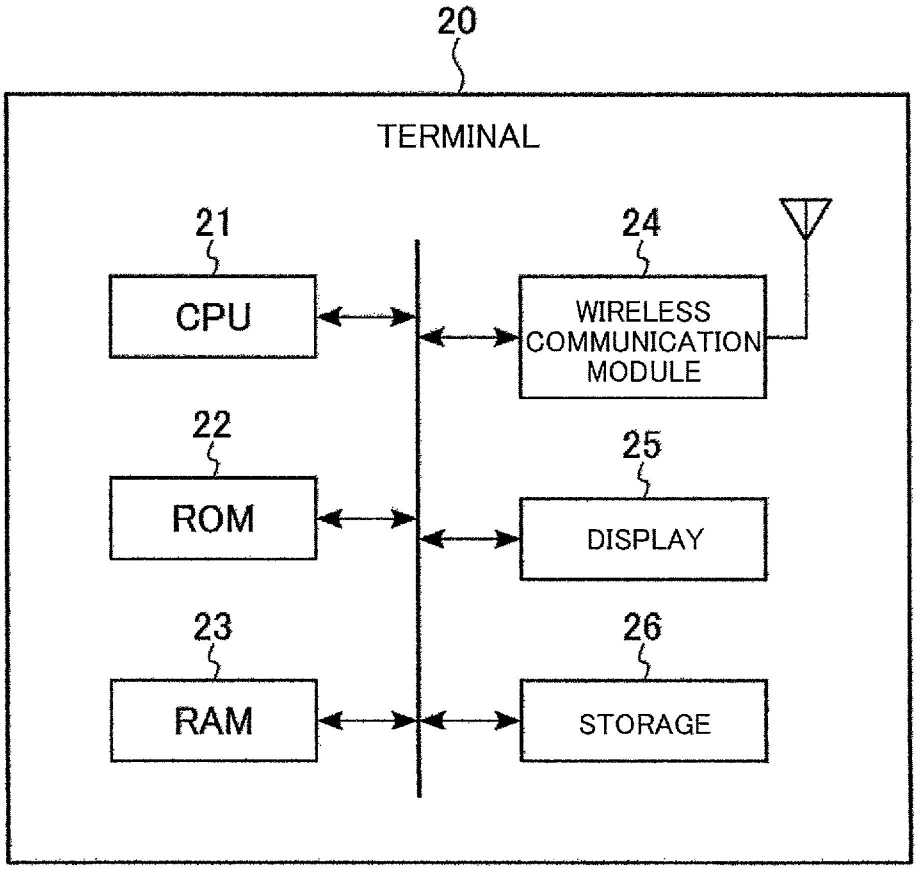
FIG. 5 is a diagram illustrating one example of a configuration of a terminal.

FIG. 5 illustrates one example of a configuration of the terminal 20. As shown in FIG. 5, the terminal 20 includes, for example, a CPU 21, a ROM 22, a RAM 23, a wireless communication module 24, a display 25, and a storage 26.

The CPU 21 is a circuit capable of executing various programs, and controls overall operations of the terminal 20. The ROM 22 is a non-volatile semiconductor memory and retains, for example, a program and control data for controlling the terminal 20. The RAM 23 is, for example, a volatile semiconductor memory and is used as a work area of the CPU 21. The wireless communication module 24 is a circuit used to transmit and receive data by wireless signals and is connected to an antenna. The wireless communication module 24 includes, for example, a plurality of communication modules respectively corresponding to a plurality of frequency bands. The display 25 displays, for example, a graphical user interface (GUI) corresponding to application software. The display 25 may include a function as an input interface of the terminal 20. The storage 26 is a non-volatile storage device and retains, for example, system software of the terminal 20. The terminal 20 may not include a display.

Figure 6:
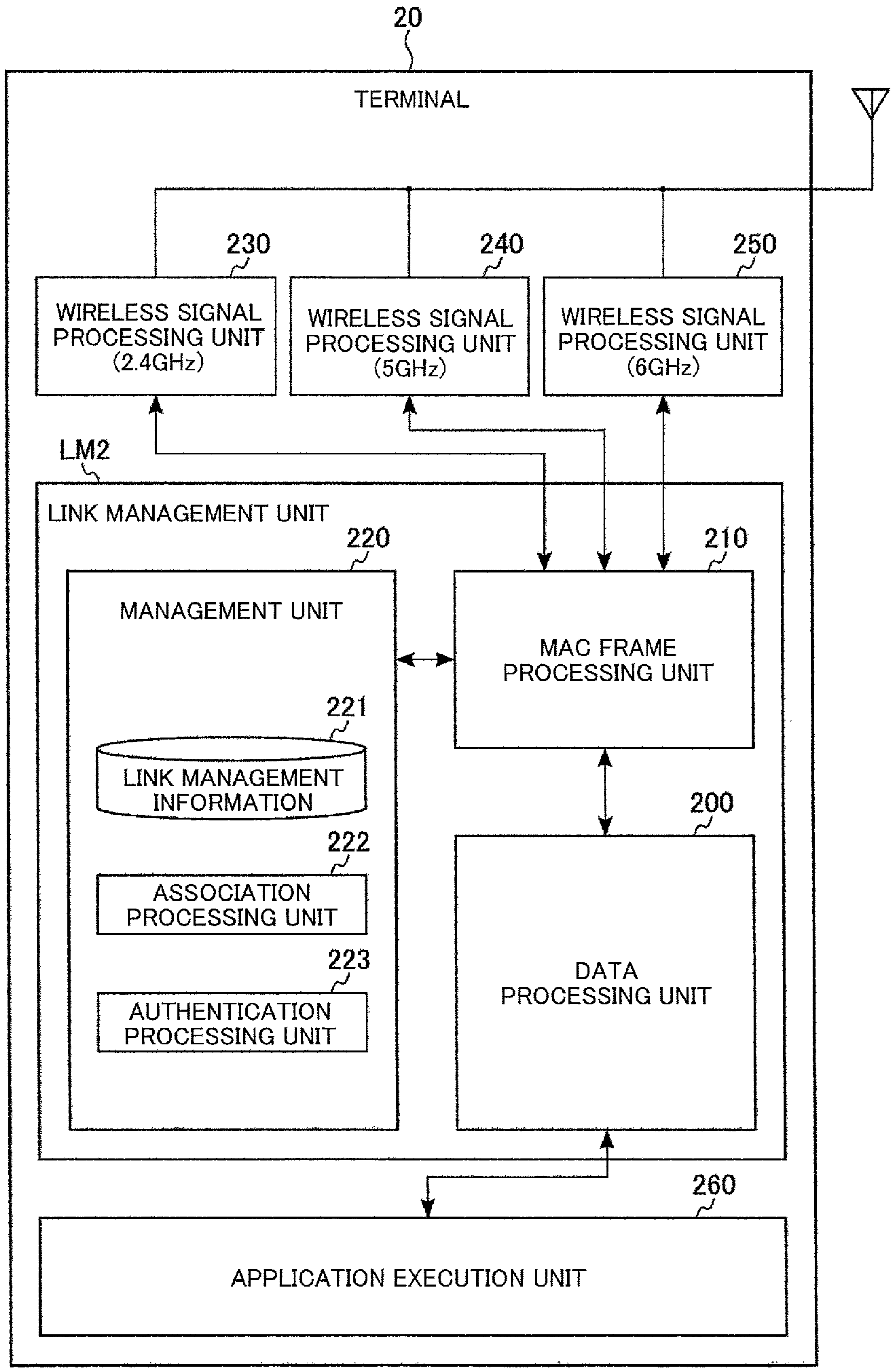
FIG. 6 is a diagram illustrating one example of a functional configuration of the terminal.

FIG. 6 shows one example of a functional configuration of the terminal 20 included in the wireless system 1 according to the embodiment. As shown in FIG. 6, the terminal 20 includes, for example, a data processing unit 200, a MAC frame processing unit 210, a management unit 220, wireless signal processing units 230, 240 and 250, and an application execution unit 260. Processing of the data processing unit 200, the MAC frame processing unit 210, the management unit 220, and the wireless signal processing units 230, 240 and 250 is implemented by, for example, the CPU 21 and the wireless communication module 24. The processing of the application execution unit 260 is implemented by, for example, a CPU 21.

The data processing unit 200 can perform the processing of the LLC layer and the processing of the higher layers (the third to seventh layers) on the input data. For example, the data processing unit 200 outputs the data input from the application execution unit 260 to the MAC frame processing unit 210. Moreover, the data processing unit 200 outputs the data input from the MAC frame processing unit 210 to the application execution unit 260.

The MAC frame processing unit 210 executes processing of, for example, the MAC layer on the input data. The MAC frame processing unit 210 generates a MAC frame from the data input by the data processing unit 200. Moreover, the MAC frame processing unit 210 restores data from the MAC frames input by the wireless signal processing units 230, 240 and 250, respectively. The processing of generating the MAC frame from the data and the processing of restoring the data from the MAC frame are performed based on the IEEE 802.11 protocol. When a traffic type of the input data is a specific type, the MAC frame processing unit 210 duplicates the input data and generates a MAC frame based on the replicated data. The specific type is, for example, RTA traffic. When the MAC frame is generated based on the replicated data, the MAC frame processing unit 210 attaches to the MAC frame identification information indicating whether or not the MAC frame is based on the replicated data. The MAC frame processing unit 210 selects one of the original and replicated MAC frames when the input MAC frames include the identical frames.

The management unit 220 manages a link with the access point 10 based on notifications received from the wireless signal processing units 230, 240 and 250 via the MAC frame processing unit 210. The management unit 220 includes link management information 221. The link management information 221 is stored in, for example, the RAM 23 and includes information regarding the access point 10 wirelessly connected to the terminal 20. The management unit 220 includes an association processing unit 222 and an authentication processing unit 223. When the association processing unit 222 receives the connection request of the access point 10 via one of the wireless signal processing units 230, 240, and 250, the association processing unit 222 executes a protocol related to association. The authentication processing unit 223 executes a protocol related to authentication following the connection request. Hereinafter, a set of the data processing unit 200, the MAC frame processing unit 210, and the management unit 220 is referred to as a link management unit LM2 of the terminal 20.

Each of the wireless signal processing units 230, 240 and 250 transmits and receives data between the access point 10 and the terminal 20 using wireless communication. For example, each of the wireless signal processing units 230, 240 and 250 adds a preamble or a PHY header to the MAC frame input from the MAC frame processing unit 210 to create a wireless frame. Each of the wireless signal processing units 230, 240 and 250 then converts the wireless frame into a wireless signal and distributes the wireless signal via an antenna of the terminal 20. Each of the wireless signal processing units 230, 240 and 250 converts a wireless signal received via the antenna of the terminal 20 into a wireless frame. Moreover, each of the wireless signal processing units 230, 240 and 250 outputs data included in the wireless frame (for example, MAC frame) to the MAC frame processing unit 210.

Consequently, each of the wireless signal processing units 230, 240 and 250 can perform, for example, a part of the processing of the MAC layer and the processing of the first layer on the input data or the wireless signal. For example, the wireless signal processing unit 230 covers wireless signals in the 2.4 GHz band. The wireless signal processing unit 240 covers wireless signals in the 5 GHz band. The wireless signal processing unit 250 covers wireless signals in the 6 GHz band. The wireless signal processing units 230, 240, and 250 may or may not share the antenna of the terminal 20.

The application execution unit 260 executes an application which can use the data input from the data processing unit 200. For example, the application execution unit 260 can display information regarding the application on the display 25. The application execution unit 260 can operate based on an operation of the input interface.

In the wireless system 1 according to the embodiment described above, the wireless signal processing units 130, 140 and 150 of the access point 10 can be connected to the wireless signal processing units 230, 240 and 250 of the terminal 20, respectively. That is, the wireless signal processing units 130 and 230 can be wirelessly connected using the 2.4 GHz band. The wireless signal processing units 140 and 240 can be wirelessly connected using the 5 GHz band. The wireless signal processing units 150 and 250 can be connected wirelessly using the 6 GHz band. In the present specification, each wireless signal processing unit may be referred to as a "STA function". That is, the wireless system 1 according to the embodiment has a plurality of STA functions.

Figure 7:
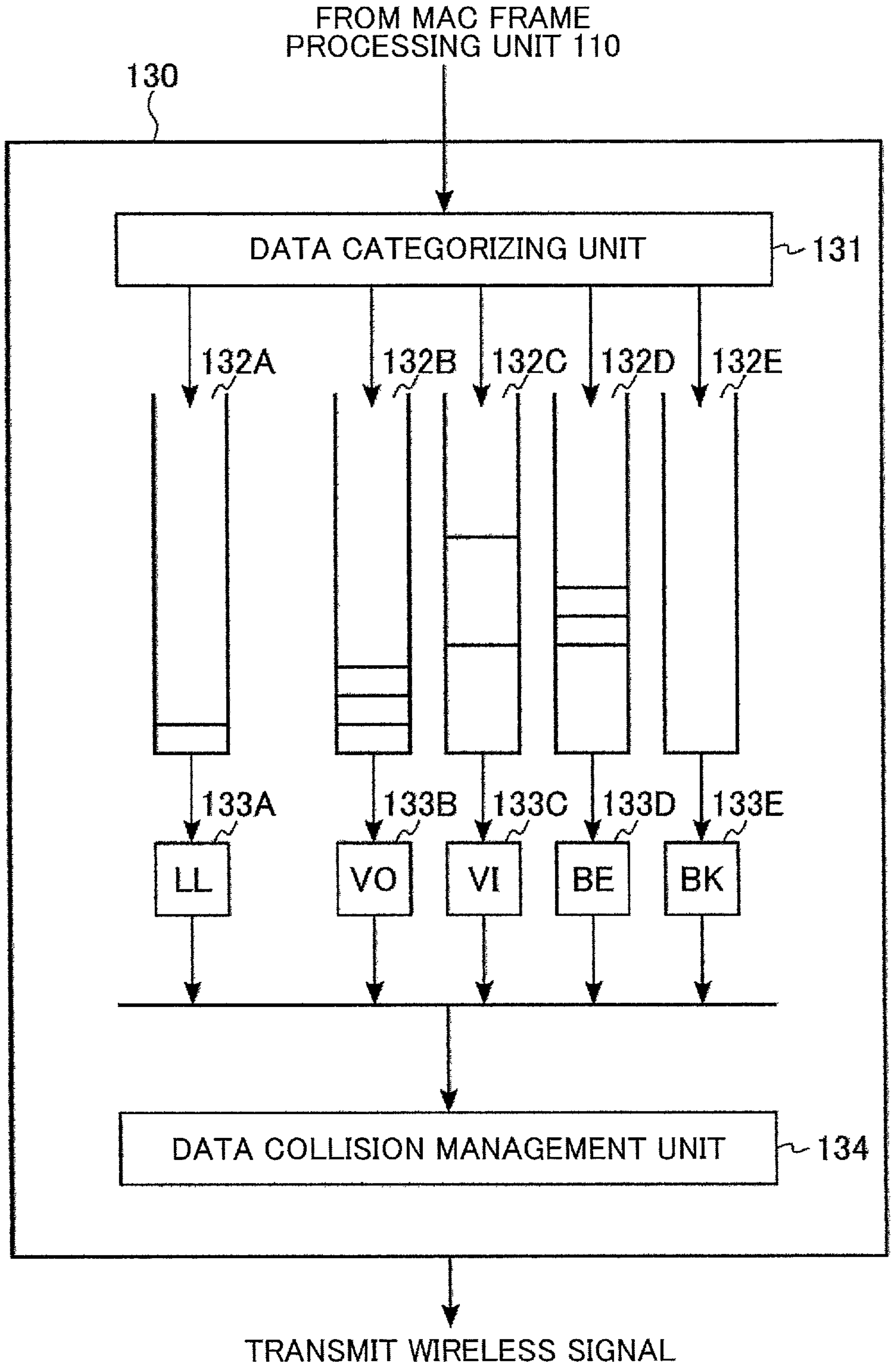
FIG. 7 is a diagram illustrating details of a channel access function in as an access point.

FIG. 7 shows the details of a channel access function in the wireless signal processing units of the access point 10. In the example shown in the embodiment, the wireless signal processing units 130, 140 and 150 have channel access functions, respectively. FIG. 7 shows a channel access function of the wireless signal processing unit 130. The channel access functions of the wireless signal processing units 140 and 150 are the same as that of the wireless signal processing unit 130. Therefore, the descriptions for the channel access functions of the wireless signal processing units 140 and 150 will be omitted. The wireless signal processing units 230, 240 and 250 of the terminal 20 also have channel access functions, respectively. The channel access functions of the wireless signal processing units 230, 240 and 250 are also the same as that of the wireless signal processing unit 130. Therefore, the descriptions for the channel access functions of the wireless signal processing units 230, 240 and 250 will be omitted.

As shown in FIG. 7, the channel access function includes, for example, a data categorizing unit 131, transmission queues 132A, 132B, 132C, 132D and 132E, CSMA/CA (carrier-sense multiple access with collision avoidance) execution units 133A, 133B, 133C, 133D and 133E, and a data collision management unit 134. In the embodiment, for example, the channel access function is implemented by EDCA (enhanced distribution channel access).

The data categorizing unit 131 categorizes data of the MAC frame input from the MAC frame processing unit 110 using, for example, TID. The TID is given in units of application (session) covered by the terminal 20 and represents a traffic type. Data categories include, for example, "LL (low latency)", "VO (voice)", "VI (video)", "BE (best effort)" and "BK (background)." The LL is applied to data corresponding to RTA traffic for which low delay is required. It is preferable that LL data be processed over any of VO, VI, be and BK data.

The data categorizing unit 131 inputs the MAC frame including categorized data to one of the transmission queues 132A, 132B, 132C, 132D and 132E. Specifically, the MAC frame including the LL data is input to the transmission queue 132A. The MAC frame including the VO data is input to the transmission queue 132B. The MAC frame including the VI data is input to the transmission queue 132C. The MAC frame including the BE data is input to the transmission queue 132D. The MAC frame including the BK data is input to the transmission queue 132E. Each of the input MAC frames is stored in one of the corresponding transmission queues 132A to 132E.

Each of the CSMA/CA execution units 133A, 133B, 133C, 133D and 133E wait for transmission for an amount of time defined by a preset access parameter, while checking that no wireless signal is transmitted from, for example, other terminals by carrier sensing in CSMA/CA. Furthermore, the CSMA/CA execution units 133A, 133B, 133C, 133D and 133E extract the MAC frame from the transmission queues 132A, 132B, 132C, 132D and 132E, respectively, and output the extracted MAC frame to the STA function via the data collision management unit 134. Then, the STA function of the wireless signal processing unit 130 generates a wireless signal on the basis of the input MAC frame, and transmits the wireless signal.

The CSMA/CA execution unit 133A performs CSMA/CA for the MAC frame including the LL data held in the transmission queue 132A. The CSMA/CA execution unit 133B performs CSMA/CA for the MAC frame including the VO data held in the transmission queue 132B. The CSMA/CA execution unit 133C performs CSMA/CA for the MAC frame including the VI data held in the transmission queue 132C. The CSMA/CA execution unit 133D performs CSMA/CA for the MAC frame including the BE data held in the transmission queue 132D. The CSMA/CA execution unit 133E performs CSMA/CA for the MAC frame including the BK data held in the transmission queue 132E.

In EDCA, the access parameters are allocated such that wireless signal transmission is prioritized in the order of, for example, LL, VO, VI, BE and BK. The access parameters include, for example, CWmin, CWmax, AIFS and TXOPLimit. CWmin and CWmax represent the minimum and maximum values of a contention window CW, respectively, which is a transmission waiting time for avoiding collision. AIFS (arbitration inter-frame space) indicates a fixed transmission waiting time set for each access category for collision avoidance control with a priority control function. TXOPLimit indicates an upper limit of TXOP (transmission opportunity) corresponding to an occupancy time of a channel. For example, the transmission queue can obtain a transmission authorization more easily as CWmin and CWmax are shorter. The smaller the AIFS is, the higher the priority of the transmission queue is. The amount of data transmitted with one transmission authorization increases as a value of TXOPLimit increases.

When the plurality of CSMA/CA execution units obtain the transmission authorization with the same STA function, the data collision management unit 134 prevents data collision. Specifically, the data collision management unit 134 adjusts transmission timings of data in which the transmission authorization is obtained with the same STA function and different categories and transmits the data belonging to a category with higher priority from the MAC frame to the STA function. For example, the STA function obtaining the transmission authorization by CSMA/CA of the transmission queue 132A for LL may obtain the transmission authorization at the same time as the STA function obtaining the transmission authorization by CSMA/CA of any one of the other transmission queues 132B to 132E. In this case, the data collision management unit 134 preferentially transmits the MAC frame stored in the transmission queue 132A to the STA function. It is the same for when in combination with any one of the other transmission queues 132B to 132E; the MAC frame is transmitted similarly in order which is based on the priority set in the categories. Thus, collision of data for which transmission is allocated to the same STA function can be avoided.

The channel access function described above may be implemented in the link management unit LM1 instead of the wireless signal processing units 130, 140 and 150. In a case where each wireless signal processing unit has a channel access function, data will be transmitted as each STA function independently executes its own carrier sensing. At this time, channel access may be established by sharing access parameters by means of interactions between a plurality of STA functions, or alternatively, may be established by sharing access parameters by means of the link management unit, in a case where a plurality of links are used simultaneously. The access point 10 and the terminal 20 can use a plurality of links at the same time by transmitting data among a plurality of STA functions based on the common access parameters. Meanwhile, in a case where a channel access function is implemented in the link management unit, each wireless signal processing unit detects a state (idle/busy) of a wireless channel in a corresponding link, and the link management unit determines whether or not data can be transmitted, such as selection of a link used for transmission.

One example of operations related to a multi-link of the wireless system 1 according to the embodiment will be described hereinbelow. In the following description, for better understanding, it is assumed that the access point 10 and the terminal 20 establish a multi-link by two STA functions STA1 and STA2, respectively.

Figure 8:
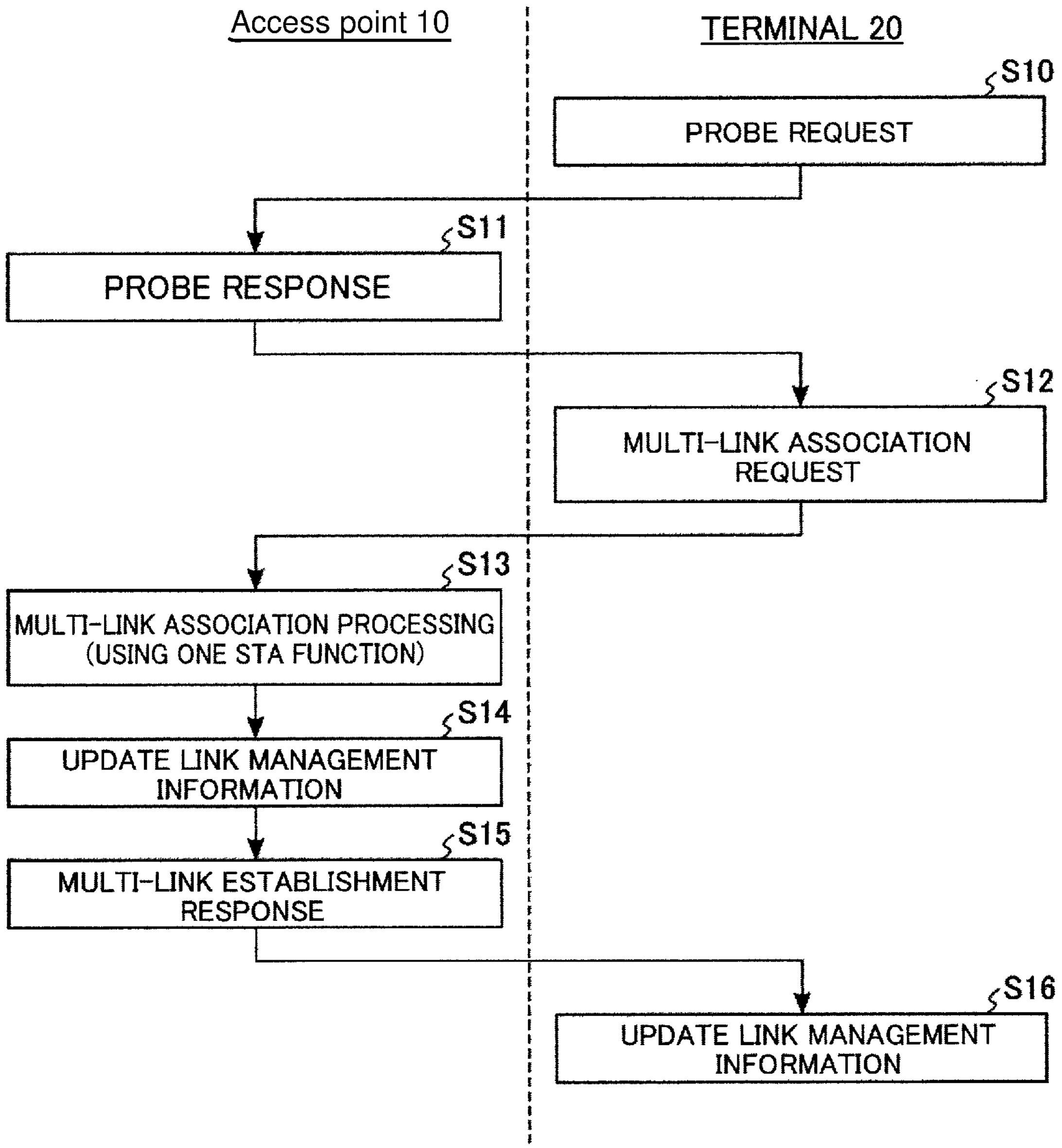
FIG. 8 is a flowchart illustrating one example of multi-link processing in the wireless system according to the embodiment.

FIG. 8 is a flowchart illustrating one example of multi-link processing in the wireless system 1 according to the embodiment. As shown in FIG. 8, for example, processing of steps S10 to S16 is executed sequentially in the multi-link processing.

In particular, the terminal 20 transmits a probe request to the access point 10 in the processing of step S10. The probe request is a signal for confirming whether or not the access point 10 is present around the terminal 20. The Frame Control field in the probe request includes, for example, "00/0100 (Type value/Subtype value)". Upon receiving the probe request, the access point 10 executes the processing of step S11.

The access point 10 transmits a probe response to the terminal 20 in the processing of step S11. The probe response is a signal used by the access point 10 for a response to the terminal 20. The Frame Control field in the probe response includes, for example, "00/0101 (Type value/Subtype value)". Upon receiving the probe response, the terminal 20 executes the processing of step S12.

The terminal 20 transmits a multi-link association request to the access point 10 via at least one STA function in the processing of step S12. The multi-link association request is a signal for requesting the access point 10 to establish a multi-link. For example, the multi-link association request is generated by the management unit 220 of the terminal 20. The Frame Control field in the multi-link association request includes, for example, "00/0000 (Type value/Subtype value) ". Upon receiving the multi-link association request, the management unit 120 of the access point 10 executes the processing of step S13.

The management unit 120 of the access point 10 executes multi-link association processing using one STA function in the processing of step S13. In particular, the access point 10 executes association processing for a first STA function with the terminal 20. When a wireless connection (link) is established in the first STA function, the management unit 120 of the access point 10 executes association processing of a second STA function using the first STA function for which the link is established. That is, the STA function for which the link is established is used for association processing of an STA function without established link. When the association processing of at least two STA functions is completed, the access point 10 establishes the multi-link and executes the processing of step S14.

A multi-link may be established when the link is established in the first STA function. For example, each of the access point 10 and the terminal 20 collectively performs the association for the multi-link by providing notifications of capability of the multi-link, a link that is a target of the multi-link, and an operation parameter in each link before association processing. Specifically, when the first STA function starts association, the management units 120 and 220 instruct establishment of a multi-link and designate a link that is a target of the multi-link, for example. Thus, the management units 120 and 220 perform association for each link and manage these links as a multi-link.

The management unit 120 of the access point 10 updates the link management information 121 in the processing of step S14. Note that in this example, the processing of step S14 is executed after two links are established, but the link management information 121 may be updated each time a link state is updated, or may be updated when the multi-link is established. When the multi-link is established and the link management information is updated, the access point 10 executes the processing of step S15.

The access point 10 transmits a multi-link establishment response to the terminal 20 in the processing of step S15. The multi-link establishment response is a signal used by the access point 10 for a response to the multi-link request from the terminal 20. The Frame Control field in the multi-link establishment response includes, for example, "00/0001 (Type value/Subtype value)". The management unit 220 of the terminal 20 recognizes that the multi-link with the access point 10 has been established based on the fact that the multi-link establishment response is received. Upon receiving the multi-link establishment response, the terminal 20 executes the processing of step S16.

The management unit 220 of the terminal 20 updates the link management information 221 in the processing of step S16. That is, the terminal 20 records that the multi-link with the access point 10 has been established in the link management information 221. Thus, the multi-link setup in the wireless system 1 according to the embodiment is completed, and data communication using the multi-link is enabled between the access point 10 and the terminal 20.

FIG. 9 illustrates one example of the link management information 121. Since the link management information 221 of the terminal 20 has information similar to the link management information 121 of the access point 10, the description thereof will be omitted. As shown in FIG. 9, the link management information 121 includes, for example, information on a STA function, a frequency band, a link destination ID, a presence of a multi-link, and TID.

In this example, "STA1" corresponds to a STA function using a 6 GHz frequency band, that is, the wireless signal processing unit 150 or 250. "STA2" corresponds to a STA function using a 5 GHz frequency band, that is, the wireless signal processing unit 140 or 240. "STA3" corresponds to a STA function using a 2.4 GHz frequency band, that is, the wireless signal processing unit 130 or 230.

The link destination ID represents an identifier of the terminal 20 in the link management information 121 and represents an identifier of the access point 10 in the link management information 221.

The presence of a multi-link indicates whether or not a multi-link using the corresponding STA function has been established. FIG. 9 shows an example where a multi-link using STA1 and STA2 has been established.

"TID" indicates an association between the STA function and the TID. Each STA function transmits and receives data corresponding to the associated TID. For example, TID #1 is TID of RTA traffic and corresponds to LL. Each of TID #2 and TID #3 corresponds to any one of VO, VI, BE and BK, other than LL. In the embodiment, a plurality of STA functions are associated with RTA traffic, that is, TID #1. One or more STA functions may be associated with traffic other than the RTA traffic, that is, TID #2 and TID #3. In the example shown in FIG. 9, one STA function is associated with TID #2 and TID #3.

FIG. 10 is a diagram illustrating one example of association information between TID and a primary link, further included in the link management information 121. The primary link is a link used as a main link in the multi-link. A secondary link is a link used as an auxiliary link in the multi-link. When a plurality of STA functions are associated with one TID, at least one of those STA functions is associated with the primary link and the rest functions are associated with the secondary link. In the example shown in FIG. 9, STA1 and STA2 are associated with the TID #1. In this case, either STA1 or STA2 is associated with the primary link for TID #1. In the example shown in FIG. 10, STA1 is set as the primary link, and STA2 is set as the secondary link. Only one STA function is associated with TID #2 and TID #3. In this case, association information between the TID and the primary link is not set.

In the embodiment, each of the MAC frame processing units 110 and 210 duplicates the input data when data corresponding to RTA traffic, that is, TID #1 is input. Each of the MAC frame processing units 110 and 210 outputs a MAC frame including original data of a duplication source to STA1 as the primary link, and outputs a MAC frame including replicated data as a MAC frame for retransmission to STA2 as the secondary link. That is, in the embodiment, data for retransmission is transmitted in advance without waiting for a retransmission request from a transmission destination for RTA traffic.

Meanwhile, when data corresponding to traffic other than the RTA traffic, i.e. TID #2 or TID #3, is input, each of the MAC frame processing units 110 and 210 outputs such data to the STA associated with TID.

When there are a plurality of terminals 20, for each terminal 20 that establishes a multi-link with the access point 10, a link sets constituting each multi-link may be different from each other, and primary links may also be different from each other. By allowing different primary links, an optimal link between the access point 10 and each terminal 20 can be set as a primary link. Thus, advantageous effects such as improvement in the quality of wireless communication are expected.

Furthermore, the primary link is used for transmission and reception of control information relating to the operations of the multi-link in addition to transmission and reception of the assigned data. The primary link may be preset, for example, when establishing a multi-link between the access point 10 and the terminal 20. The STA function used as the primary link may be set in priority in accordance with a frequency band or may be set in accordance with a radio field strength of the link.

Figure 11:
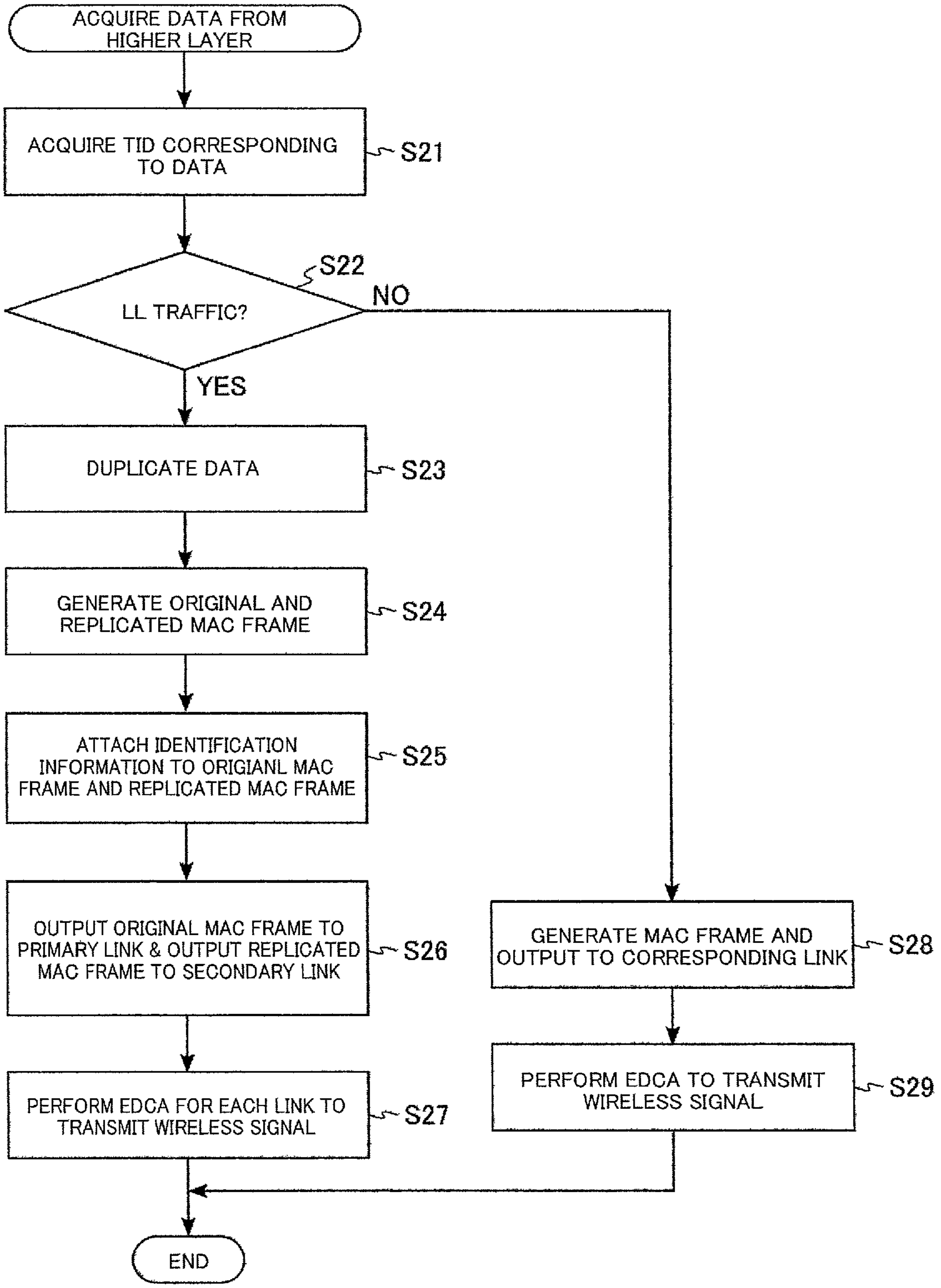
FIG. 11 is a flowchart illustrating one example of transmission processing of wireless signals in the wireless system.

One example of a flow of data transmission/reception in the wireless system 1 will be described hereinbelow. FIG. 11 is a flowchart illustrating one example of transmission processing of wireless signals in the wireless system 1. Hereinafter, the access point 10 is a transmitting station that transmits wireless signals. The processing in FIG. 11 is initiated when data from the server 30 that is at a higher layer, for example, is input to the MAC frame processing unit 110 via the data processing unit 100. In the following description, a multi-link is already set up between the access point 10 and the terminal 20. That is, it is assumed that the link management information 121 shown in FIGS. 9 and 10 is set.

In step S21, the MAC frame processing unit 110 acquires TID corresponding to the input data.

In step S22, the MAC frame processing unit 110 determines whether or not the input data is data corresponding to RTA traffic based on the acquired TID. When it is determined in step S22 that the input data is data corresponding to RTA traffic, the processing proceeds to step S23. When it is determined in step S22 that the input data is not data corresponding to RTA traffic, the processing proceeds to step S28.

In step S23, the MAC frame processing unit 110 duplicates the input data. Two or more duplicates may be generated in step S23. In a case two or more duplicates are generated, a multi-link using three or more STA functions should be established between the access point 10 and the terminal.

In step S24, the MAC frame processing unit 110 generates a MAC frame from the input original data. The MAC frame processing unit 110 also generates a MAC frame from the replicated data. The MAC frame based on the original data and the MAC frame based on the replicated data are the same except that identification information to be described later is different. That is, the original MAC frame based on the original data and the MAC frame based on the replicated data have the same sequence number.

In step S25, the MAC frame processing unit 110 attaches identification information to each of the original MAC frame and the replicated MAC frame. As described above, the identification information is information indicating whether or not the MAC frame is based on the replicated data. In the embodiment, the replicated data is used as data for retransmission. Therefore, the Retry value stated above can be used as the identification information. For example, the Retry value of the original MAC frame is given "0". The Retry value of the replicated MAC frame used for retransmission is given "1". This is the same when there are two or more replicated MAC frames. With such identification information, the original MAC frame and the replicated MAC frame can be identified among a plurality of MAC frames having the same sequence number. The identification information may be given as an extended MAC header using a reservation bit. In this case, the identification information may have two types of information, that is, information indicating whether or not the MAC frame has a duplicate, and information indicating whether the MAC frame is the original MAC frame or the replicated MAC frame. The Retry value can be used for information indicating whether the MAC frame is the original MAC frame or the replicated MAC frame among the two types of information.

In step S26, the MAC frame processing unit 110 outputs the original MAC frame to a STA function (wireless signal processing unit) of a primary link of a corresponding TID, and outputs the replicated MAC frame to a STA function of a secondary link of the corresponding TID. When there are two or more primary links, the MAC frame processing unit 110 may output the original MAC frame and the replicated MAC frame to different primary links, respectively. That is, in step S26, the original MAC frame and the replicated MAC frame are respectively output to different STA functions.

In step S27, the STA function of each link transmits a wireless signal using EDCA based on CSMA/CA. The processing of FIG. 11 then ends. In step S27, the STA function of each link independently transmits a wireless signal using EDCA. In the step S27, the STA function of each link may transmit wireless signals in parallel at the same time while cooperating channel access. In a case where wireless signals are transmitted in parallel at the same time, the MAC frame processing unit 110 may control a channel access function such that wireless signals can be transmitted in parallel at the same time on the basis of a notification of CSMA/CA from the STA function of each link. Further, the MAC frame processing unit 110 may notify the STA functions of the respective links of the common access parameters, and each STA function may transmit wireless signals using EDCA.

In step S28, the MAC frame processing unit 110 generates a MAC frame from the input data. Then, the MAC frame processing unit 110 outputs the generated MAC frame to the STA function of the corresponding link.

In step S29, the STA function transmits a wireless signal using EDCA based on CSMA/CA. The processing of FIG. 11 then ends.

Figure 12:
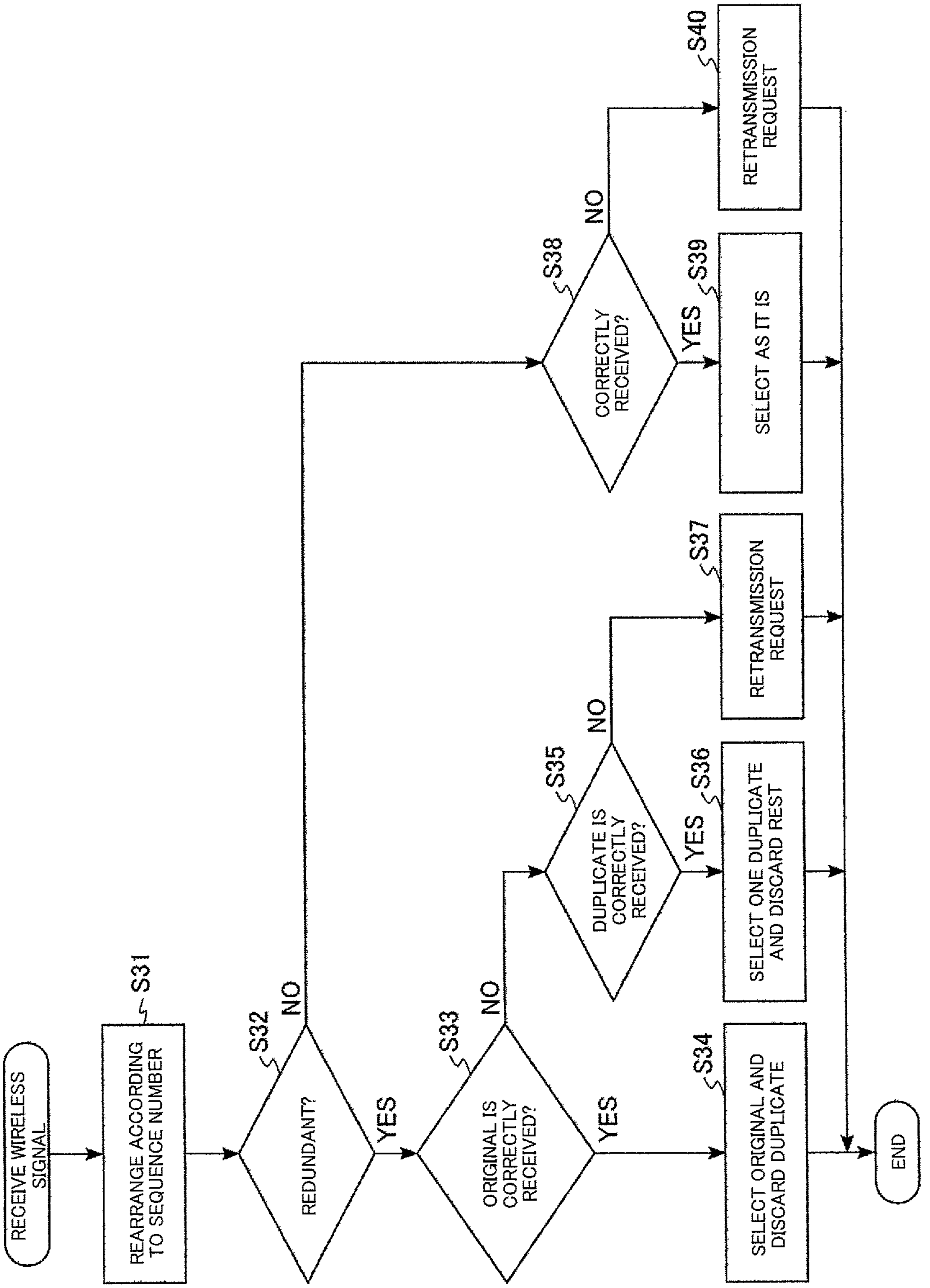
FIG. 12 is a flowchart illustrating one example of reception processing of wireless signals in the wireless system.

FIG. 12 is a flowchart illustrating one example of reception processing of wireless signals in the wireless system 1. Hereinafter, the terminal 20 is a receiving station that receives wireless signals. The process of FIG. 12 is initiated when the MAC frames from the respective STA functions are input to the MAC frame processing unit 210.

In step S31, the MAC frame processing unit 210 rearrange the input MAC frames in the order of the sequence number.

In step S32, the MAC frame processing unit 210 determines whether or not there are redundant MAC frames among the input MAC frames. Redundancy can be determined from, for example, whether or not there are MAC frames with the same sequence number. When it is determined in step S32 that there are redundant MAC frame, i.e. both the original and replicated MAC frames have been received, the processing proceeds to step S33. When it is determined in S32 that there are no redundant MAC frames, the processing proceeds to step S38.

In step S33, the MAC frame processing unit 210 determines whether or not the original MAC frame has been correctly received. The original MAC frame and the replicated MAC frame are identified by, for example, the Retry value. Whether the MAC frame has been correctly received or not can be determined by FCS. When it is determined in step S33 that the original MAC frame has been correctly received, the processing proceeds to step S34. When it is determined in step S33 that the original MAC frame has not been correctly received, the processing proceeds to step S35.

In step S34, the MAC frame processing unit 210 selects the original MAC frame and discard all the replicated MAC frames. The processing of FIG. 12 then ends. After the processing shown in FIG. 12, data is restored from the MAC frame, and the data is used in, for example, applications at a higher layer.

In step S35, the MAC frame processing unit 210 determines whether or not any one of the replicated MAC frames has been correctly received. When it is determined in step S35 that any one of the replicated MAC frames has been correctly received, the processing proceeds to steps S36. When it is determined in step S35 that all of the replicated MAC frames has not been correctly received, the processing proceeds to steps S37.

In step S36, the MAC frame processing unit 210 selects one of the replicated MAC frames correctly received, and discards the original MAC frame and the remaining replicated MAC frames. The processing of FIG. 12 then ends. After the processing shown in FIG. 12, data is restored from the MAC frame, and the data is used in, for example, applications at a higher layer. Here, when two or more replicated MAC frames have been correctly received in step S36, which replicated MAC frame is selected can be determined appropriately. For example, if a priority is assigned to the STA functions, the MAC frame processing unit 210 may select the MAC frames to be left according to the priority. The priority may be fixed or changed according to, for example, carrier sense results. Priority information may be included in the replicated MAC frame.

In step S37, the MAC frame processing unit 210 requests for retransmission to the access point 10. Retransmission may be performed using a primary link or a secondary link. Retransmission may be requested in a form of block ACK. The processing of FIG. 12 then ends. After the processing shown in FIG. 12, the wireless signal is retransmitted from the access point 10. As described above, the retransmission request is made for data corresponding to the RTA traffic only when both the original and replicated MAC data are failed and not received in the embodiment.

In step S38, the MAC frame processing unit 210 determines whether or not the input MAC frame has been correctly received. When it is determined in step S38 that the input MAC frame has been correctly received, the processing proceeds to step S39. When it is determined in step S38 that the input MAC frame has not been correctly received, the processing proceeds to step S40.

In step S39, the MAC frame processing unit 210 selects the input MAC frame. The processing of FIG. 12 then ends. After the processing shown in FIG. 12, data is restored from the MAC frame, and the data is used in, for example, applications at a higher layer.

In step S40, the MAC frame processing unit 210 requests for retransmission to the access point 10. Retransmission may be performed using a primary link or a secondary link. Retransmission may be requested in a form of block ACK. The processing of FIG. 12 then ends. After the processing shown in FIG. 12, the wireless signal is retransmitted from the access point 10.

In a case where the STA function of each link independently transmits a wireless signal using EDCA, transmission timings of the original MAC frame and the replicated MAC frame may be deviated depending on, for example, a channel state of each link. In this case, if it is found that there is a duplicate by the identification information, the receiving station may execute the same processing as that shown in FIG. 12 after waiting for receiving the original and replicated MAC frames, or alternately, may leave a MAC frame which has been correctly received earlier out of the original and replicated MAC frames, and discard a MAC frame received later.

As described above, when the traffic type of the input data is a specific type, the input data is duplicated. The original data is transmitted using the STA function of one link, and the replicated data is transmitted as data for retransmission using the STA function of a link different from that for the original data. In the embodiment, the data for retransmission is transmitted prior to the retransmission request from the receiving station by link diversity. Thus, delay accompanying retransmission is avoided as compared with a case where retransmission is performed in response to the retransmission request from the receiving station.

The original data and the replicated data for retransmission are transmitted in parallel at the same time, whereby the receiving station receives two pieces of the same data almost simultaneously. However, since the original data is given identification information indicating that it is the original and the replicated data is given identification information indicating that it is a duplicate, the receiving station can correctly identify and process the original data and the replicated data.

MODIFIED EXAMPLE 1

Variations on the embodiment will be described hereinbelow. In the embodiment described above, the access point 10 is a transmitting station that transmits wireless signals, and the terminal 20 is a receiving station that receives wireless signals. However, the technology of the embodiment can be applied to a situation where the terminal 20 transmits wireless signals and the access point 10 receives wireless signals. In other words, a relationship between the transmitting station and the receiving station described in the embodiment can be interchanged.

MODIFIED EXAMPLE 2

In the embodiment, the STA functions are configured to transmit and receive wireless signals using channels with frequency bands different from each other. However, the STA functions may be configured to transmit and receive wireless signals using different channels but with the same frequency band as each other. For example, the wireless signal processing unit 130 may be configured to transmit wireless signals using a first channel in a 2.4 GHz band and the wireless signal processing unit 140 may be configured to transmit wireless signals using a second channel in a 2.4 GHz band. In this case, the first channel and the second channel may each include a plurality of channels, as long as they are not redundant.

MODIFIED EXAMPLE 3

In the embodiment, whether or not to duplicate data for retransmission is determined by TID. However, if the data requires low delay, the data for retransmission may be duplicated without depending on the judgment based on TID.

OTHER MODIFIED EXAMPLES

Each processing in the embodiment described above can also be stored as a program executable by, for example, a CPU that is a computer. In addition, programs can be stored and distributed in a storage medium of an external storage device such as a magnetic disk, an optical disk or a semiconductor memory. The CPU can then execute the processing stated above by reading the programs stored in the storage medium of the external storage device, and controlling the operations by the read programs.

The present invention is not limited to the embodiments described above and can be modified without departing from the gist of the present invention when carried out. Embodiments may be combined as appropriate, and in such a case, combined effects can be achieved. The embodiments described above include various aspects of the invention, and the various aspects of the invention can be extracted by combinations selected from a plurality of disclosed elements. For example, even when some of all the elements disclosed in the embodiments are removed, as long as the problems can be solved and the advantageous effects can be obtained, a configuration from which the elements are removed can be recognized as one aspect of the invention.

REFERENCE SIGNS LIST

1 wireless system
10 access point
20 terminal
30 server
11, 21 CPU
12, 22 ROM
13, 23 RAM
14, 24 wireless communication module
15 wired communication module
25 display
26 storage
100, 200 data processing unit
110, 210 MAC frame processing unit
120, 220 link management unit
121, 221 link management information
122, 222 association processing unit
123, 223 authentication processing unit
130, 140, 150, 230, 240, 250 wireless signal processing unit
131 data categorizing unit
132A, 132B, 132C, 132D, 132E transmission queues
133A, 133B, 133C, 133D, 133E CSMA/CA (carrier sense multiple access with collision avoidance) execution unit
134 data collision management unit

The invention claimed is:

1. A transmitting station that transmits wireless signals, the station comprising:

a first wireless signal processing circuit configured to transmit a first wireless signal using a first channel;

a second wireless signal processing circuit configured to transmit a second wireless signal using a second channel different from the first channel;

a processor; and a storage medium having computer program instructions stored therein that, when executed by the processor, perform to:

generate, when first data is of a specific type, second data that is a duplicate of the first data;

attach, to the first data, first identification information indicating that the first data is original data and attach, to the second data, second identification information indicating that the second data is replicated data; and output the first data with the first identification information attached to the first wireless signal processing circuit for transmission using the first channel and output the second data with the second identification information attached to the second wireless signal processing circuit for transmission using the second channel.

2. The transmitting station according to claim 1, wherein the first identification information indicates is indicative of not retransmitted data, and the second identification information is indicative of retransmitted data.

3. The transmitting station according to claim 1, wherein the first data and the second data are associated with a same sequence number.

4. The transmitting station according to claim 1, wherein the computer program instructions, when executed, set up a primary link using the first wireless signal processing circuit as a main link in a multi-link, and set up a secondary link using the second wireless signal processing circuit as an auxiliary link in the multi-link.

5. The transmitting station according to claim 1, wherein a type of the first data is identified based on a traffic type of the data.

6. The transmitting station according to claim 1, wherein the specific type of data includes data corresponding to real-time traffic having absolute-delay conditions.

7. A receiving station that receives wireless signals, the station comprising:

a first wireless signal processing circuit configured to receive a first wireless signal using a first channel;

a second wireless signal processing circuit configured to receive a second wireless signal using a second channel different from the first channel;

a processor; and a storage medium having computer program instructions stored therein that, when executed by the processor, perform to:

when first identification information indicating that first data received using the first channel is original data is attached to the first data and second identification information indicating that second data received using the second channel is replicated data of the first data is attached to the second data, select the first data, and discard the second data.

8. The receiving station according to claim 7, wherein the computer program instructions, when executed, perform to, when the first data is not correctly received, select the second data and discard the first data.

* * * * *